June 21, 1960 D. RICHMAN 2,942,060
SIGNAL-TRANSLATING SYSTEM FOR COLOR-TELEVISION RECEIVER
Filed Jan. 8, 1954
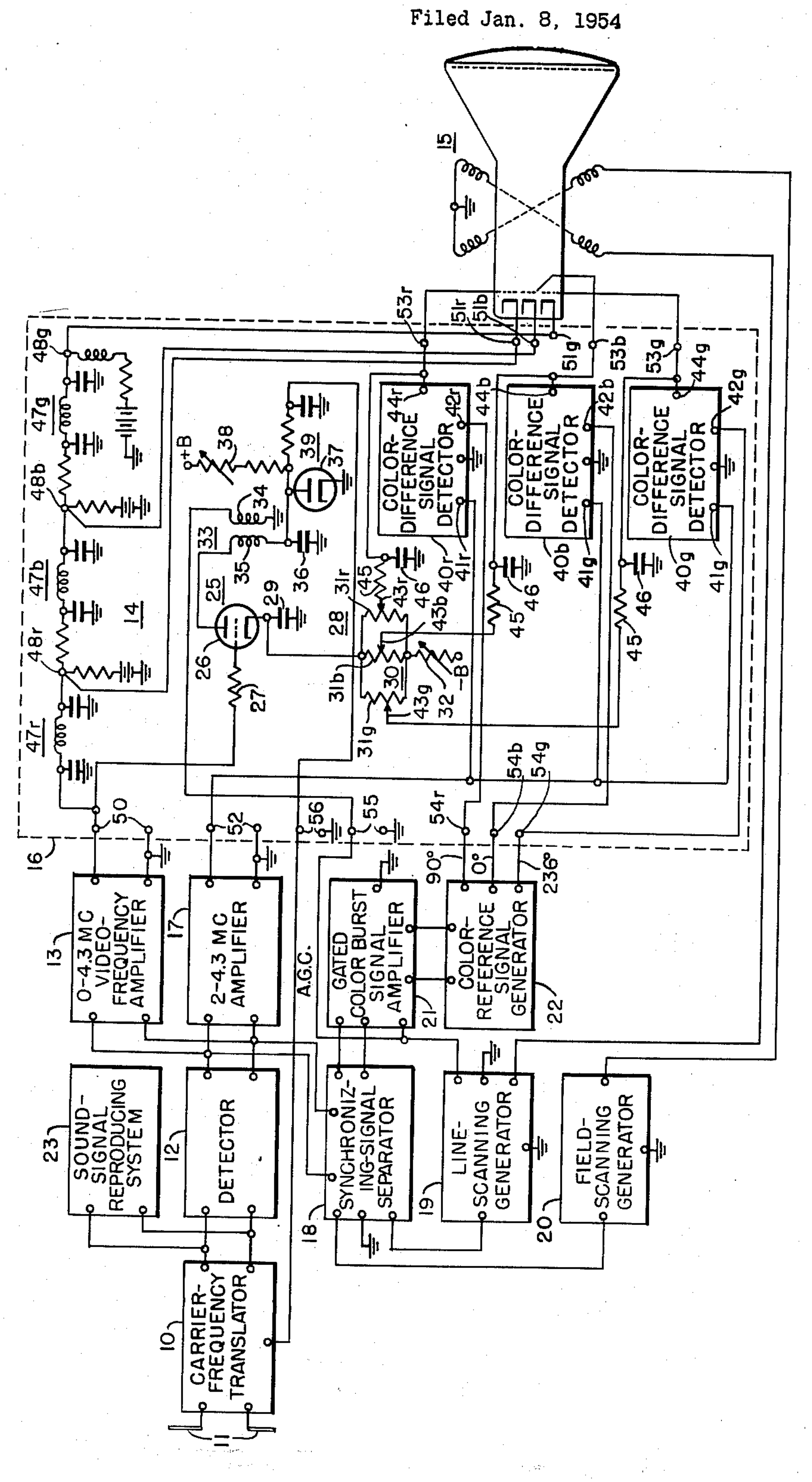

2,942,060

SIGNAL-TRANSLATING SYSTEM FOR COLOR-TELEVISION RECEIVER

Donald Richman, Fresh Meadows, N.Y., assignor to Hazeltine Research, Inc., Chicago, Ill., a corporation of Illinois Filed Jan. 8, 1954, Ser. No. 402,841

14 Claims. (Cl. 178—5.4)

GENERAL

The present invention relates to signal-translating systems for color-television receivers and, more particularly, to such systems which are effective in color-television receivers to translate to the image-reproducing apparatus thereof a plurality of components representative of the color of a televised image, components representative of the luminance thereof, and also a derived potential representative of a predetermined brightness or shade level of the luminance-representative components.

In a typical color-television system, such as that described in an article entitled "Principles of NTSC Compatible Color Television" by C. J. Hirsch, W. F. Bailey, and B. D. Loughlin in the February, 1952 issue of the magazine "Electronics" at pages 88–95, inclusive, information representative of the brightness and the color of an image being televised is utilized to develop at the transmitter two substantially simultaneous signals, one representative of the brightness or luminance of that image, and the other of the color thereof. The signal representative of the luminance is a wide-band signal essentially the same as the conventional monochrome signal translated in present-day monochrome television systems. The signal representative of the color of the image is a subcarrier wave signal having a frequency less than the highest video frequency, for example, a frequency of approximately 3.58 megacycles, and which is modulated in amplitude at different phase points by signals individually representative of the primary colors of the televised image. These two representative signals are combined at the transmitter in an interleaved manner to form a composite color signal occupying a common pass band in the video-frequency range. In addition to the conventional line-synchronizing and field-synchronizing signals, there is also included with the composite color signal a color-synchronizing signal, specifically, a short burst or pulse of about 10 cycles of the unmodulated subcarrier signal having a predetermined reference phase. This pulse is conventionally transmitted on the "back-porch" region of the pedestals immediately succeeding the line-synchronizing signals.

At a color-television receiver in such a system, the above-mentioned composite color signal is derived and the luminance signal is translated through video-frequency amplifiers and applied to a brilliancy-control electrode system of a color image-reproducing apparatus to develop a black-and-white image of the televised scene. There is also included in the receiver a generator for developing a reference wave signal which is heterodyned in the color-signal detector system with the modulated subcarrier wave signal to derive the color signals at the different phase points of that wave signal. In order to assure the derivation of proper color signals, the signal developed by the local generator is maintained at the same frequency as and in the proper phase relation with the subcarrier wave signal by means of the color-synchronizing signal. The derived color signals are applied to the brilliancy-control electrode system of the image-reproducing device to add color to the black-and-white image formed from the luminance signal.

Alternating-current signal-translating systems including amplifiers and color-signal detecting devices are currently used between the second detector of a color-television receiver and the brilliancy-control electrode systems of the image-reproducing apparatus. Consequently, the original unidirectional or steady-state components representative of the average background illumination of an image are lost because of the alternating-current couplings. In order to recover the components just mentioned, a color-television receiver ordinarily employs three direct-current restorers for reinserting in each of the signals derived by the three color-television channels a signal representative of the average brightness level or background illumination. These restorers are essentially peak detectors and, accordingly, are highly susceptible to random noise pulses of amplitude greater than the amplitude of the desired line-synchronizing pulses to which they are intended to respond. These direct-current restorers include time-constant networks having condensers which are charged to erroneously high levels by the noise impulses, and the condensers often maintain such charges for rather extended periods of time determined by the time constants of the networks, thus seriously upsetting the average brightness level in the reproducing color image.

Direct-current restorer systems of the type mentioned above are also adversely affected by the color-synchronizing signal which has an amplitude nearly equal to that of the line-synchronizing and field-synchronizing pulses. The color-synchronizing pulses are in phase with the information translated through the signal-translating channels of the receiver which translate the blue component of the composite color signal, and these synchronizing pulses manifest themselves in the channel as undesired periodic pulses of negative polarity occurring at a line-frequency rate. The direct-current restorer in such a channel is actuated by these negative pulses and derives erroneous average brightness information which causes the average brightness of the reproduced image to rise, thereby imparting a bluish cast thereto.

To avoid the difficulty occasioned by the presence of the color-synchronizing signal in the blue color-signal translating channel of a color-television receiver, it has been proposed that the color-signal translating channels of the receiver be momentarily disabled by the color-synchronizing signal for the duration of each pulse of that signal. This expedient may require the use of additional circuit components including signal-deriving means responsive to the color-synchronizing signal for deriving a disabling signal and, therefore, has a disadvantage of increasing receiver costs more than is desired for some purposes.

When a monochrome television signal is being received by a compatible color-television receiver which was previously adjusted to receive a color-television signal, and that receiver is of the type which does not disable the color-signal translating channels thereof during the intervals of the color-synchronizing pulses, it is usually necessary to readjust the background controls of the receiver in order that the reproduced black-and-white image be a faithful reproduction. Similarly, a second readjustment is required when a color-television program is thereafter received. Such adjustments are necessary because the energy content of the usual synchronizing signals plus the color burst synchronizing pulses of a color-television signal are greater than that of the synchronizing pulses of a monochrome television signal. Obviously, it would be desirable to eliminate the need for such adjustments in a compatible color-television receiver.

It is an object of the present invention, therefore, to provide for use in a color-television receiver a new and improved signal-translating system which avoids one or more of the above-mentioned disadvantages and limitations of prior such systems.

It is another object of the present invention, therefore, to provide for use in a color-television receiver a new and improved signal-translating system which is substantially unaffected by random noise pulses or the color-synchronizing signal which may be applied to the color-signal translating channels of the receiver.

It is also an object of the present invention, therefore, to provide for use in a color-television receiver a new and improved signal-translating system which is effective to permit the color image-reproducing apparatus of the receiver to reproduce a color image with substantially the correct average brightness.

It is an additional object of the present invention, therefore, to provide for use in a color-television receiver a new and improved signal-translating system which does not require a plurality of direct-current restorers therein.

It is yet another object of the present invention, therefore, to provide for use in a color-television receiver a new and improved signal-translating system which is relatively simple in construction and inexpensive to manufacture.

In accordance with the invention, there is provided a signal-translating system for use in a color-television receiver having color-image-reproducing apparatus and which derives from a received color-television signal a composite signal which includes line-synchronizing pulses, components representative of the luminance and a plurality of components representative of the color of a color image, and the unidirectional background component but subject to undesired random noise pulses. This system comprises a circuit arrangement including a rectifier device, circuit means coupled to the rectifier device for applying thereto the aforesaid composite color signal including the background component, a time-constant network coupled between the rectifier device and a fixed potential point, gating circuit means coupled to the rectifier device for applying thereto conduction-enabling pulses synchronous with the synchronizing pulses, and means for developing across that network a potential varying dynamically with the peak amplitudes of the synchronizing pulses and for developing from a fraction of the aforesaid potential at least another potential substantially unaffected by the aforesaid noise pulses and representative of a predetermined brightness level of the luminance-representative components. The signal-translating system also includes means including a plurality of signal-translating channels for individually translating individual ones of the color-representative components. The signal-translating system further includes means connecting the aforesaid network with individual ones of the signal-translating channels for effectively combining that other potential with individual ones of the color-representative components, and means for individually applying that combined information and the luminance-representative components to the color image-reproducing apparatus.

For a better understanding of the present invention, together with other and further objects thereof, reference is had to the following description taken in connection with the accompanying drawing, and its scope will be pointed out in the appended claims.

Referring to the drawing, there is represented a circuit diagram, partly schematic, of a color-television receiver including a signal-translating system in accordance with a particular form of the invention.

*General description of receiver*

Referring now to the drawing, there is represented a color-television receiver of the superheterodyne type similar in many details to that described in the above-mentioned article in "Electronics." The receiver includes a carrier-frequency translator 10 having an input circuit coupled to an antenna system 11, 11. The translator 10 is of conventional construction and may include, in cascade, one or more radio-frequency amplifier stages, an oscillator-modulator, and one or more intermediate-frequency amplifier stages. Coupled in cascade with the output circuit of the translator 10 are, in the order named, a detector 12, a video-frequency amplifier 13 of one or more stages preferably having a pass band of about 0–4.3 megacycles for translating the luminance-representative components including the unidirectional component derived by the detector 12, a tapered impedance network 14, and an image-reproducing apparatus 15 preferably comprising a tricolor cathode-ray tube including three electron guns each including a control electrode and a cathode and being individually responsive to different color signals. The network 14 includes a pair of input terminals 50, 50 and also includes three ungrounded output terminals **51*r*, 51*b*, and 51*g* which are connected to the cathodes of the electron guns which produce red, blue, and green light, respectively. The network 14 comprises a portion of a signal-translating system 16 in accordance with the present invention and hence will be described more fully hereinafter. The image-reproducing apparatus 15** may be one of the type more fully described in an article entitled, "General Description of Receivers for the Dot-Sequential Color Television System Which Employ Direct-View Tri-Color Kinescopes," in the RCA Review for June 1950, at pages 228–232, inclusive. It will be understood, however, that other types of cathode-ray tube image-reproducing apparatus capable of producing an image in color may be employed, such as the type including three cathode-ray tubes arranged in the well-known manner with relation to a dichroic mirror system for reproducing a colored image.

The output circuit of the detector 12 is coupled through a band-pass amplifier 17 of one or more stages to another pair of input terminals 52, 52 of the signal-translating system 16. The amplifier 17 is effectively an alternating-current amplifier and preferably has a pass band of about 2–4.3 megacycles for translating the modulated subcarrier wave signal of the composite color signal derived by the detector 12. The terminals 52, 52 are coupled to input circuits of a color-signal detecting and translating apparatus of the unit 16, which apparatus will be described more fully hereinafter and includes individual output terminals **53*r*, 53*b*, and 53*g* for supplying, respectively, the red, blue, and green color-difference signals to the control electrodes of the electron guns which are instrumental in producing red, green, and blue light on the fluorescent screen of the image-reproducing apparatus 15**.

The output circuit of the detector 12 is also coupled through a synchronizing-signal separator 18 to a line-scanning generator 19 and a field-scanning generator 20, output circuits of the generators being coupled, respectively, to the line-deflecting and the field-deflecting windings of the image-reproducing apparatus 15. An output circuit of the synchronizing-signal separator 18 which supplies at least the 3.58 megacycle color burst synchronizing signal is coupled to a first input circuit of a gated color burst signal amplifier 21, and the second input circuit of the latter is coupled to an output circuit of the line-scanning generator 19 that supplies gating pulses which occur during the line-retrace intervals and which coincide with the intervals of the color burst signal. The output circuit of the amplifier 21 is coupled to a conventional color-reference signal generator 22 that operates at a frequency of substantially 3.58 megacycles and includes three output circuits for supplying to input terminals **54*r*, 54*b*, and 54*g* of the signal-translating system 16** unmodulated color-reference wave signals, for example, having relative phases of 90°, 0°, and 236°, in accordance with the Revised Specifications for Field-Test of NTSC Compatible Color Television which were approved by the National Television System Committee in February 1953. It should be understood, however, that in accordance with well-known color-television practice, the output signals of unit 22 may comprise a pair of signals or may be three signals having other suitable relative phase relations corresponding with the phase points at which the transmitted subcarrier wave signal is modulated. The generator 22 also includes an automatic-frequency-control system for maintaining predetermined frequency and phase relations between the signal applied thereto by the amplifier 21 and the output signals applied to the terminals 54*r*, 54*b*, and 54*g*.

An output circuit of the line-scanning generator 19 is coupled through a pair of terminals 55, 55 to an input circuit of the unit 16 to be described subsequently. The negative terminal of a pair of output terminals 56, 56 of the signal-translating system 16 is coupled through a control-circuit conductor labeled AGC to the input terminals of one or more of the stages in the carrier-frequency translator 10 to maintain the signal input to the detector 12 within a relatively narrow range for a wide range of received signal intensities. A sound-signal reproducing system 23 is coupled to the output circuit of the translator 10 and may include conventional intermediate-frequency amplifier stages, a sound-signal detector, one or more stages of audio-frequency amplification, and a sound-reproducing device.

It will be understood that the various units thus far described, with the exception of the signal-translating device 16, may be of conventional construction and design, the details of which are well known in the art and do not require further description.

*General operation of receiver*

Considering briefly now the operation of the receiver as a whole, a color-television signal is intercepted by the antenna system 11, 11, is selected, amplified, converted to an intermediate frequency and further amplified in the unit 10, and a video-frequency signal comprising a composite color signal is derived in the detector 12. This composite color signal includes line-synchronizing, field-synchronizing, and color-synchronizing pulses, components representative of the luminance and a plurality of components representative of the color of a color image, and the unidirectional background component, but is subject to undesired random noise pulses of high amplitude. The luminance-representative components are amplified in the video-frequency amplifier 13 and are applied through portions of the impedance network 14 coupled through terminals 51*r*, 51*b*, and 51*g* to the cathodes of the image-reproducing apparatus 15. The line-synchronizing, field-synchronizing, and color-synchronizing pulses are separated in unit 18 from the other components of the composite color signal. Unit 18 also separates the line-synchronizing and field-synchronizing pulses from each other and applies them in the order named to the generators 19 and 20 to synchronize the operation thereof with the operation of corresponding units at the transmitter. The generators 19 and 20 supply signals of saw-tooth wave form for application to the line-deflecting and the field-deflecting windings of the image-reproducing apparatus 15 to effect the rectilinear scanning of the image screen thereof.

Individual color-synchronizing pulses, comprising a few cycles of an unmodulated wave signal, are applied with a desired reference phase to the gated color burst signal amplifier 21, and control pulses supplied to the latter by the line-scanning generator 19 during line-retrace intervals are effective periodically to render amplifier 21 conductive so that there is applied to the generator 22 a color burst signal unaffected by random noise pulses occurring during the intervals between the color-synchronizing pulses. Generator 22 develops 3.58 megacycle output signals having relative phases of 90°, 0°, and 236° for application to the color-signal detecting apparatus of unit 16 which derives and translates the color-difference signals identified, respectively, as $R-Y$, $B-Y$, and $G-Y$ through the output terminals 53*r*, 53*b*, and 53*g* to the control electrodes of apparatus 15. A unidirectional potential representative of a predetermined shade of black level of the luminance-representative components is also applied to the terminals just mentioned in a manner which will be explained subsequently.

An automatic-gain-control potential derived in unit 16 is supplied by the terminals 56, 56 and the control-circuit conductor AGC to one or more stages of unit 10, thereby to maintain the signal input to the detector 12 and to the sound-signal reproducing system 23 within a relatively narrow range for a wide range of received signal intensities. The sound-modulated wave signal which is selected and amplified in the unit 10 is applied to the sound-signal reproducing system 23 wherein it is amplified and detected to derive the sound-signal modulation components which may be further amplified and applied to the reproducing system of unit 23.

*Description of signal-translating system 16*

Referring now more particularly to the signal-translating system 16, that unit includes a rectifier apparatus 25 including a rectifier device preferably in the form of a triode 26 having the usual anode, cathode, and control electrode, and a circuit coupled to that triode, specifically, to the control electrode and the cathode thereof for applying thereto the composite color signal including the unidirectional background component. The circuit just mentioned comprises the direct-current path between the ungrounded input terminal 50 and the control electrode of the tube 26, which path includes a current-limiting resistor 27 connected in series relation therein and responsive to the current through the control electrode-cathode path of the tube produced by applied noise pulses for grid-limiting the magnitude of the latter. The rectifier apparatus also includes a time-constant network 28 coupled between the cathode of the tube 26 and a fixed potential point such as ground and having a time constant at least several times the period of the synchronizing pulses. This time-constant network comprises a condenser 29 which is effectively connected in parallel with a resistive network including a plurality of parallel-connected adjustable resistive voltage dividers 31*r*, 31*b*, and 31*g* having a terminal remote from the cathode connected to a source of potential $-B$ through an adjustable resistor 32 which serves as a brightness control.

The rectifier apparatus 25 further includes a gating circuit preferably coupled between the anode and the cathode of tube 26 for applying thereto gating pulses synchronous with the line-synchronizing pulses to develop across the time-constant network 28 a potential representative of and varying dynamically with the peak amplitudes of the synchronizing pulses and to develop from a fraction of that potential at least another potential, but preferably several potentials, substantially unaffected by noise pulses and representative of a predetermined brightness level of the luminance-representative components. This gating circuit comprises the input terminals 55, 55, which are coupled to an output circuit of the line-scanning generator 19 which develops the so-called "flyback" pulses occurring during the retrace intervals of the signal developed by the generator 19, and circuit connections and elements between the terminals 55, 55 and the anode and cathode of the tube 26. This gating circuit includes a transformer 33 having a primary winding 34 connected to the terminals 55, 55 and a secondary winding 35 with one terminal connected to the anode of tube 26 and the other terminal connected to ground through a condenser 36 which has a predetermined relatively low impedance at the frequency of the gating pulses and a substantially higher impedance to space-current pulses through tube 26 which sometimes occur at a recurrence rate within a range of 30–500 cycles per second as explained in detail in applicant's copending application Serial No. 517,614, filed June 23, 1955, as a continuation-in-whole of application Serial No. 225,388, filed May 9, 1951, and entitled "Control Apparatus for Television Receivers."

The rectifier apparatus preferably includes a circuit for deriving an automatic-gain-control potential which is substantially unaffected by random noise pulses. This circuit may be one of the type described and claimed in applicant's above-identified copending application. In addition to the portions of the rectifier apparatus just described, this circuit also includes a clamping or level-setting device in the form of a diode 37 connected in parallel with the condenser 36 with the cathode thereof connected to ground. The circuit for deriving the automatic-gain-control potential further includes a resistor 38 connected between the anode of the diode 37 and a source of potential +B, and an audio-frequency filter network 39 coupled between the anode of the diode 37 and the automatic-gain-control output terminals 56, 56.

The signal-translating system 16 additionally includes a plurality of signal-translating channels for individually translating individual ones of the color-representative components. These channels comprise the output circuits of the three color-difference signal detectors 40*r*, 40*b*, and 40*g* having output terminals 44*r*, 44*b*, and 44*g* which are connected to output terminals 53*r*, 53*b*, and 53*g* that in turn are connected to the control electrodes of the image-reproducing apparatus 15. For some applications these signal-translating channels may include suitable direct-current buffer amplifiers (not shown) connected between the output terminals of the color-difference signal detectors and the control electrodes of the apparatus 15. These signal-translating channels may also be considered to include the color-difference signal-detecting apparatus including the detectors just mentioned, which detectors are modulators or synchronous detectors of a type well known in the art such as balanced detectors and responsive to an applied subcarrier wave signal modulated by the color-representative components for individually deriving in the respective output circuits thereof individual ones of the color-representative components $R-Y$, $B-Y$, and $G-Y$. The modulated subcarrier wave signal is applied to the input terminals 41*r*, 41*b*, and 41*g* of the color-difference signal detectors through connections from the input terminals 52, 52 connected to the amplifier 17. Reference-wave signals developed by the color-reference signal generator 22 and having the frequency of the received subcarrier wave signal and the relative phases indicated at the terminals 54*r*, 54*b*, and 54*g* are applied by connections from those terminals to another set of input terminals 42*r*, 42*b*, and 42*g* of the units 40*r*, 40*b*, and 40*g*.

The signal-translating system 16 also includes circuits connecting one portion of the time-constant impedance network 28, namely, individually adjustable taps 43*r*, 43*b*, and 43*g* on the voltage dividers 31*r*, 31*b*, and 31*g* of the resistive impedance network 30, with individual ones of the signal-translating channels comprising the output circuits associated with the output terminals 44*r*, 44*b*, and 44*g* of the color-difference signal detectors 40*r*, 40*b*, and 40*g* for effectively combining the potentials developed at the taps just mentioned with individual ones of the color-representative components appearing in the output circuits of the color-difference signal detectors and for individually applying that combined information to individual ones of the control electrodes of the image-reproducing apparatus 15. These circuits include the connections between the taps on the resistive impedance network 30 and the output terminals of the color-signal detectors, each circuit including a resistor-condenser filter network 45, 46.

The system 16 further includes individual circuits having different impedance characteristics for supplying the luminance-representative components appearing at input terminals 50, 50 to individual ones of the cathodes of the three electron guns of the image-reproducing apparatus 15 at different impedance or potential levels with, for example, the red-producing gun being supplied at one level, the blue-producing gun at a lower level, and the green-producing gun at the lowest level. These circuits include the tapered impedance network 14 having network sections 47*r*, 47*b*, and 47*g* including suitable series-connected inductors and resistors, shunt-connected condensers, and potential-level-setting sources such as batteries for affording the proper drive for each of the three electron guns. Since the phosphors of the fluorescent screen of the image-reproducing apparatus 15 have unequal efficiencies, the cathode of the red-producing electron gun is connected to the terminal 48*r* of network 14, the blue-producing gun to the terminal 48*b* and the green-producing gun to the terminal 48*g* through conductive connections.

*Operation of signal-translating system 16*

Considering now the operation of the signal-translating system 16, the 0–4.3 megacycle output signal of the direct-current video-frequency amplifier 13 comprising the luminance-representative components and the desired background component of the composite color signal derived by the detector 12 is applied with the synchronizing pulses extending in a positive direction through the input terminals 50, 50 to the tapered impedance network 14, and the latter applies these components at different impedance levels established at the terminals 48*r*, 48*b*, and 48*g* through electrical connections to the terminals 51*r*, 51*b*, and 51*g*, and to the cathodes of the red, blue, and green-producing guns, respectively, of the image-reproducing apparatus 15.

The components just mentioned of the composite color signal appearing at the terminals 50, 50 are also conductively applied to the control electrode-cathode circuit of the tube 26 through the current-limiting resistor 27. Since the bias developed across the condenser 29 is slightly greater than the potential of the tips of the line-synchronizing pulses, the tube 26 is normally nonconductive and a flow of anode current occurs only during the synchronous application of the line-synchronizing pulses and the gating pulses supplied by the line-scanning generator 19. It will be assumed that the brightness control or adjustable resistor 32 has been properly adjusted and that the taps 43*r*, 43*b*, and 43*g* have also been adjusted so that the potential appearing thereat is substantially three-quarters of that developed across the condenser 29 in the cathode circuit of the tube 26. Random noise pulses having amplitudes which exceed that of the line-synchronizing pulses tend to cause the flow of grid current in the control electrode-cathode circuit of tube 26, and the resistor 27 in that circuit effects positive clipping of those noise pulses so that the resultant pulses have an amplitude substantially equal to that of the tips of the synchronizing pulses. The synchronous application of the gating pulses to the anode-cathode circuit of the tube 26 and the line-synchronizing pulses to the control electrode-cathode circuit thereof periodically render the tube conductive and develop across the network 28 a potential varying dynamically with the peak amplitudes of the synchronizing pulses. This developed potential constitutes a varying direct-current reference level which is positive at the cathode of the tube 26 and is slightly greater than that of the peak amplitudes of the synchronizing pulses. Accordingly, this potential maintains the tube 26 in a nonconductive condition during the intervals between the synchronizing pulses. Accordingly, the tube 26 may, for example, be nonconductive for approximately 92% of the time.

Should the amplitude of the video-frequency signal and, hence, the amplitude of the line-synchronizing pulses applied to the control electrode of the tube 26 decrease for any reason such as atmospheric disturbances or fading which affects the received signal intensities, the bias developed across the network 28 decreases proportionally so that the average amplitude of the potential between the control electrode and the cathode of the tube remains at a level which bears a substantially fixed relation to the level corresponding to that of the tips of the line-synchronizing pulses applied to the control electrode of that tube. Conversely, when the amplitude of the synchronizing pulses increases, the potential across the network 28 increases in proportion to the aforesaid amplitude increase. Consequently, the reference level or potential established at the cathode of tube 26, or the potential developed across a portion of the network 28, varies in accordance with the peak amplitudes of the synchronizing pulses applied to the terminals 52, 52.

In accordance with conventional television practice, the predetermined brightness or black level of the luminance-representative components of a television signal is approximately 75% of the amplitude of the tips of the line-synchronizing pulses. Since the taps 43*r*, 43*b*, and 43*g* on the voltage dividers of network 30 are set at a level which is approximately 75% of that appearing at the cathode of the tube 26, the level of the potentials applied to the output circuits of the color-difference signal detectors by way of the filter networks 45, 46 corresponds to the correct black level of the luminance-representative components applied by the video-frequency amplifier 13 to the input terminals 50, 50 of unit 16. Thus, as the black level of the signal applied by the video-frequency amplifier 13 to the control electrode-cathode input circuit of tube 26 varies because of changes in the amplitude of the received signal, the level of the potential supplied by the resistive network 30 to the output circuits of the color-difference detectors varies a corresponding or related amount. The use of separate taps 43*r*, 43*b*, and 43*g* in lieu of a single tap permits individual adjustment of the background bias potentials supplied to the output circuits of each of the color-difference signal detectors to establish the proper color balance. The rectifier apparatus 25 thus assures accurate black-level control or stabilization with but a single triode. Since the apparatus 25 is relatively insensitive to high-amplitude noise as a result of the tube 26 being conductive for about 8% of the time and also because of the grid-current limiting effected by the resistor 27, the automatic black-level stabilization provided by the rectifier apparatus is substantially unaffected by noise.

Potential changes corresponding to those appearing across the network 28 but of opposite polarity thereto are developed across the condenser 36. Since the time constant of the condenser 36 and the resistor 38 is long with respect to the interval between line-synchronizing pulses, an average potential related to the peak amplitudes of those line-synchronizing pulses and, hence, the carrier amplitude, is developed across the condenser 36 and, after filtering by the network 39, constitutes a relatively noise-free automatic-gain-control potential which is applied through the terminals 56, 56 and the conductor AGC to the gain-control circuits of one or more of the stages of the carrier-frequency translator 10 to maintain the signal input to the detector 12 within a relatively narrow range for a wide range of received signal intensities. The operation of the rectifier device 25 in connection with circuit elements such as the diode 37 and the condenser 36 is explained in detail in applicant's previously identified copending application, Serial No. 225,388.

An alternating-current signal comprising the subcarrier wave signal modulated by the color-representative components is applied by the terminals 52, 52 to the input terminals 41*r*, 41*b*, and 41*g* of the respective color-difference signal detectors 40*r*, 40*b*, and 40*g*, while the reference signals having the 90°, 0°, and 236° relative phases are supplied by the terminals 54*r*, 54*b*, and 54*g* to the respective terminals 42*r*, 42*b*, and 42*g* of the color-difference signal detectors. The $R-Y$, $B-Y$, and $G-Y$ components representative of the color of the television image are derived in the output circuits of the color-difference signal detectors at the terminals 44*r*, 44*b*, and 44*g* thereof by a heterodyning action in those units. These components have a reference level (zero potential) about which the values of the components vary. These components, however, do not include a unidirectional component or bias representative of the black level of the luminance-representative components. The potentials representative of the black level of the luminance-representative components derived at the taps 43*r*, 43*b*, and 43*g* are combined in the output circuits of the color-difference signal detectors with the color-representative components and the combined information is translated through the terminals 53*r*, 53*b*, and 53*g* to the control electrodes of the image-reproducing apparatus 15. This information together with the luminance-representative components supplied by network 14 to the cathodes of the apparatus 15 enables the latter to reproduce images in color that automatically have the correct brightness reference or black level even though the level of the received signal changes.

From the foregoing description, it will be clear that a signal-translating system in accordance with the present invention is substantially unaffected by random noise pulses or the color-synchronizing signal. It will also be manifest that a signal-translating system for use in a color-television receiver and embodying the present invention does not require a plurality of direct-current restorers therein.

While there has been described what is at present considered to be the preferred embodiment of this invention, it will be obvious to those skilled in the art that various changes and modifications may be made therein without departing from the invention, and it is therefore, aimed to cover all such changes and modifications as fall within the true spirit and scope of the invention.

What I claim is:

1. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential at least another potential substantially unaffected by said noise pulses and representative of a predetermined brightness level of said luminance-representative components; means including a plurality of signal-translating channels for individually translating individual ones of said color-representative components; means connecting said network with individual ones of said signal-translating channels for effectively combining said other potential with individual ones of said color-representative components; and means for individually applying that combined information and said luminance-representative components to said color image-reproducing apparatus.

2. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network including a resistive network coupled between said device and a fixed potential point, and gating circuit means coupled to said device for applying thereto conduction-enabling pulses synchronous with said synchronizing pulses; means for developing across said time-constant network a potential varying dynamically with the peak amplitudes of said synchronizing pulses and for developing from a fraction of said potential across predetermined portions of said resistive network other potentials substantially unaffected by said noise pulses and representative of a predetermined brightness level of said luminance-representative components; means including a plurality of signal-translating channels for individually translating individual ones of said color-representative components; means connecting said predetermined portions of said resistive network with individual ones of said signal-translating channels for effectively combining said other potentials with individual ones of said color-representative components; and means for individually applying that combined information and said luminance-representative components to said color image-reproducing apparatus.

3. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device having a cathode, circuit means coupled to said device for applying thereto said composite color signal including said background component, a time-constant network coupled between said cathode and a fixed-potential point, and gating circuit means coupled to said device for applying thereto conduction-enabling pulses synchronous with said synchronizing pulses; means for developing across said network a potential representative of and varying dynamically with the peak amplitudes of said synchronizing pulses and for developing from a fraction of said potential at least another potential substantially unaffected by said noise pulses and representative of a predetermined brightness level of said luminance-representative components; means including a plurality of signal-translating channels for individually translating individual ones of said color-representative components; means connecting said network with individual ones of said signal-translating channels for effectively combining said other potential with individual ones of said color-representative components; and means for individually applying that combined information and said luminance-representative components to said color image-reproducing apparatus.

4. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device having an anode, a cathode, and a control electrode, circuit means coupled to said control electrode and said cathode for applying thereto said composite color signal including said background component, a time-constant network coupled between said cathode and a fixed-potential point; and gating circuit means coupled between said anode and said cathode for applying thereto conduction-enabling pulses synchronous with said synchronizing pulses; means for developing across said network a potential representative of and varying dynamically with the peak amplitudes of said synchronizing pulses and for developing from a fraction of said potential at least another potential substantially unaffected by said noise pulses and representative of a predetermined brightness level of said luminance-representative components; means including a plurality of signal-translating channels for individually translating individual ones of said color-representative components; means connecting said network with individual ones of said signal-translating channels for effectively combining said other potential with individual ones of said color-representative components; and means for individually applying that combined information and said luminance-representative components to said color image-reproducing apparatus.

5. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, said circuit means including a resistor connected in series relation therein and responsive to current through said rectifier device produced by said noise pulses for limiting the magnitude thereof, a time-constant network coupled between said device and a fixed potential point, and gating circuit means coupled to said device for applying thereto conduction-enabling pulses synchronous with said synchronizing pulses, means for developing across said network a potential varying dynamically with the peak amplitudes of said synchronizing pulses and for developing from a fraction of said potential at least another potential substantially unaffected by said noise pulses and representative of a predetermined brightness level of said luminance-representative components; means including a plurality of signal-translating channels for individually translating individual ones of said color-representative components; means connecting said network with individual ones of said signal-translating channels for effectively combining said other potential with individual ones of said color-representative components; and means for individually applying that combined information and said luminance-representative components to said color image-reproducing apparatus.

6. In a color-television receiver having color image reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point and having a time constant at least several times the period of said synchronizing pulses, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential at least another potential substantially unaffected by said noise pulses and representative of a predetermined brightness level of said luminance-representative components; means including a plurality of signal-translating channels for individually translating individual ones of said color-representative components; means connecting said network with individual ones of said signal-translating channels for effectively combining said other potential with individual ones of said color-representative components; and means for individually applying that combined information and said luminance-representative components to said color image-reproducing apparatus.

7. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point and including a plurality of adjustable voltage dividers, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential across portions of said voltage dividers another potential substantially unaffected by said noise pulses and representative of a predetermined brightness level of said luminance-representative components; means including a plurality of signal-translating channels for individually translating individual ones of said color-representative components; means connecting said portions of said voltage dividers with individual ones of said signal-translating channels for effectively combining said other potential with individual ones of said color-representative components; and means for individually applying that combined information and said luminance-representative components to said color image-reproducing apparatus.

8. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential at least another potential substantially unaffected by said noise pulses and representative of a predetermined brightness level of said luminance-representative components; color-signal detecting means including a plurality of modulators responsive to an applied subcarrier wave signal modulated by said color-representative components for individually deriving individual ones of said color-representative components; means connecting said network with individual ones of said modulators for effectively combining said other potential with individual ones of said color-representative components; and means for individually applying that combined information and said luminance-representative components to said color image-reproducing apparatus.

9. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential at least another potential substantially unaffected by said noise pulses and representative of a predetermined brightness level of said luminance-representative components; modulator means including auxiliary circuit means for applying thereto reference-wave signals and a subcarrier wave signal modulated by said color-representative components and including individual output circuits for deriving therein individual ones of said color-representative components; means connecting said network with individual ones of said output circuits for effectively combining said other potential with indiivdual ones of said color-representative components; and means for individually applying that combined information and said luminance-representative components to said color image-reproducing apparatus.

10. In a color-television receiver having color image-reproducing apparatus and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential at least another potential substantially unaffected by said noise pulses and representative of a predetermined brightness level of said luminance-representative components; modulator means including a plurality of modulators having output circuits and auxiliary circuit means for applying to individual ones of said modulators a reference-wave signal of a predetermined phase and frequency and a carrier-wave signal of said frequency modulated by said color-representative components for deriving in individual ones of said output circuits individual ones of said color-representative components; means connecting said network with individual ones of said output circuits for effectively combining said other potential with individual ones of said color-representative components; and means for individually applying that combined information and said luminance-representative components to said color image-reproducing apparatus.

11. In a color-television receiver which includes color image-reproducing apparatus having a plurality of control electrodes and a plurality of cathodes and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential at least another potential substantially unaffected by said noise pulses and representative of the black level of said luminance-representative components; means including a plurality of signal-translating channels for individually translating individual ones of said color-representative components; means connecting said network with individual ones of said signal-translating channels for effectively combining said other potential with individual ones of said color-representative components; and means for individually applying that combined information to individual control electrodes of the color image-reproducing apparatus; and means having different impedance characteristics for supplying said luminance-representative components to individual cathodes of the color image-reproducing apparatus.

12. In a color-television receiver which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential at least another potential substantially unaffected by said noise pulses and representative of a predetermined brightness level of said luminance-representative components; means including a plurality of signal-translating channels for individually translating individual ones of said color-representative components; color image-reproducing apparatus; and means connecting said network with individual ones of said signal-translating channels and with said apparatus for effectively combining said other potential with individual ones of said color-representative components and for individually applying that combined information and said luminance-representative components to said color image-reproducing apparatus.

13. In a color-television receiver which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point, and gating circuit means coupled to said device for applying thereto conduction-enabling pulses synchronous with said synchronizing pulses; means for developing across said network a potential varying dynamically with the peak amplitudes of said synchronizing pulses and for developing from a fraction of said potential at least another potential substantially unaffected by said noise pulses and representative of a predetermined brightness level of said luminance-representative components; means including a plurality of signal-translating channels for individually translating individual ones of said color-representative components; tricolor image-reproducing apparatus including three electron guns each including a control electrode and a cathode; means connecting said network with individual ones of said signal-translating channels and with individual ones of said control electrodes for effectively combining said second potential with individual ones of said color-representative components and for individually applying that combined information to said individual control electrodes; and means having different impedance characteristics coupled to individual ones of said cathodes for supplying said luminance-representative components to said individual cathodes.

14. In a color-television receiver which includes tricolor image-reproducing apparatus including three electron guns for producing red, blue, and green light and individually having a cathode and a control electrode and which derives from a received color-television signal a composite color signal including line-synchronizing pulses, components representative of the luminance and a plurality of components representative of the color of a color image, and the unidirectional background component but subject to undesired random noise pulses, a signal-translating system comprising: a circuit arrangement including a rectifier device, circuit means coupled to said device for applying thereto said composite color signal including said background component, a time-constant network coupled between said device and a fixed potential point and including three resistive impedances, and gating circuit means coupled to said device for applying thereto conduction-enabling pulses synchronous with said synchronizing pulses; means for developing across said network a potential varying dynamically with the peak amplitudes of said synchronizing pulses and for developing from said first potential across said impedances three potentials substantially unaffected by said noise pulses and representative of a predetermined brightness level of said luminance-representative components; means including a plurality of signal-translating channels for individually translating individual ones of said color-representative components; means connecting individual ones of said resistive impedances with individual ones of said signal-translating channels for effectively combining individual ones of said three potentials with individual ones of said color-representative components; means for individually applying that combined information to individual ones to the control electrodes of the three electron guns; and individual means for supplying said luminance-representative components to individual ones of the cathodes of the three electron guns at different impedance levels, the red-producing gun being supplied at one level, the blue-producing gun at a lower level, and the green-producing gun at the lowest level.

References Cited in the file of this patent

UNITED STATES PATENTS

| | | |
|---|---|---|
| 2,543,037 | Mayle | Feb. 27, 1951 |
| 2,618,703 | Lowman | Nov. 18, 1952 |
| 2,674,651 | Creamer | Apr. 6, 1954 |
| 2,684,995 | Schroeder | July 27, 1954 |
| 2,804,496 | Kirkwood | Aug. 27, 1957 |